United States Patent
Liu et al.

(10) Patent No.: US 6,766,278 B2
(45) Date of Patent: Jul. 20, 2004

(54) SYSTEM AND METHOD FOR COLLECTING INFORMATION AND MONITORING PRODUCTION

(75) Inventors: Mei-Chao Liu, Tu-Chen (TW); Teng-Tsung Huang, Tu-Chen (TW)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 61 days.

(21) Appl. No.: 10/075,360

(22) Filed: Feb. 13, 2002

(65) Prior Publication Data

US 2003/0120466 A1 Jun. 26, 2003

(51) Int. Cl.[7] ............................ G06F 11/00; B21B 37/00
(52) U.S. Cl. .................................... 702/188; 72/12.1
(58) Field of Search ........................ 702/188; 72/12.1, 72/11.6

(56) References Cited

U.S. PATENT DOCUMENTS

| | | | | |
|---|---|---|---|---|
| 5,530,857 A | * | 6/1996 | Gimza | 395/600 |
| 5,586,041 A | * | 12/1996 | Mangrulkar | 700/174 |
| 5,768,133 A | * | 6/1998 | Chen et al. | 707/2 |
| 6,047,579 A | * | 4/2000 | Schmitz | 72/15.1 |
| 6,101,857 A | * | 8/2000 | Fox et al. | 72/15.1 |
| 6,233,538 B1 | * | 5/2001 | Gupta et al. | 703/6 |
| 6,263,255 B1 | * | 7/2001 | Tan et al. | 700/121 |
| 6,408,218 B1 | * | 6/2002 | Hallahan et al. | 700/102 |
| 6,467,356 B1 | * | 10/2002 | Schoch | 73/791 |
| 6,523,045 B1 | * | 2/2003 | Beatty | 707/104.1 |

* cited by examiner

*Primary Examiner*—John Barlow
*Assistant Examiner*—Toan M. Le
(74) *Attorney, Agent, or Firm*—Wei Te Chung

(57) ABSTRACT

A system and method for collecting production information from punch machines (11) at shop floors and for monitoring production performed by the punch machines. The system comprises information collectors (12), a monitoring computer (14) and a database (16). Each information collector is attached to a corresponding punch machine, and obtains real-time production information. The monitoring computer is located remotely from the shop floors, and is respectively connected with the information collectors and the database via first and second communication links (13, 18). The monitoring computer is used for obtaining the information obtained by the information collectors according to pre-installed information obtaining instructions, and for storing the obtained information in the database. The database also stores fundamental data set by users. Therefore, users can know and control real-time production status of all shop floors at personal computers (17) connected to the database via the second communication link.

13 Claims, 6 Drawing Sheets

| function modules | sub-modules |
|---|---|
| fundamental data (41) | weekly schedule (411) |
| | daily schedule (412) |
| | die fundamental data (413) |
| | machine fundamental data (414) |
| | part number fundamental data (415) |
| | authority management (416) |
| view (42) | order (421) |
| | manufacture order (422) |
| | part number (423) |
| | production line (424) |
| | machine status (425) |
| | die number (426) |
| | counter information (427) |
| inquiry (43) | die status (431) |
| | machine status (432) |
| | whole status (433) |
| | production information (434) |
| report (44) | instant production report (441) |
| | die abnormality statistics (442) |
| | die accumulated punching times and abnormality statistics (443) |
| | work hour statistics (444) |

FIG. 4

SYSTEM AND METHOD FOR COLLECTING INFORMATION AND MONITORING PRODUCTION

BACKGROUND OF THE INVENTION

1. Field of the Invention

The present invention relates to a system and method for collecting information and monitoring production, and more particularly to a system and method for collecting punch information from shop floors and monitoring production on a real-time basis.

2. Description of Related Art

With economic globalization and intense business competition, many enterprises are facing more difficulties and challenges than ever before. Suppliers of goods have to strive to meet more stringent demands from customers, such as shorter delivery times, more customized products, higher quality and lower price. Manufacturers need to collect production information in real time to improve management of shop floors in factories. Traditionally, production information at shop floors is collected by hand. For example, by dictation and recording with a pen, or by manually inputting data into a computer terminal. It takes a long time to collect the original information, let alone effectively organize and analyze the collected information and finally respond to it. It is imperative for many enterprises to establish a system for instantly monitoring production information and quickly responding to problems identified at the shop floor. Such system can greatly improve efficiency and effectiveness of production.

With the recent development and widespread application of information technology, production information is now collected automatically at many facilities. Barcode technology is a typical means used for automated collection. To apply barcode technology, a manufacturer has to first label all the products, devices and apparatuses with barcodes. Operators at shop floors scan the barcodes with barcode readers, and the obtained production information is automatically stored into a monitoring computer. Barcode technology simplifies the collection of production information to a certain degree. However, it is costly, and the collection of information is only partly automated. In addition, information-collecting sensors attached to machines on the shop floor are usually not fully utilized.

Accordingly, what is needed is a system and method that completely automates collection of production information and that fully utilizes information-collecting sensors.

SUMMARY OF THE INVENTION

It is a primary object of the present invention to provide a system and method for collecting production information from shop floors and for monitoring production, whereby a user at a remote location can obtain real-time information on machines used in the production.

It is another object of the present invention to provide a system and method for collecting production information from shop floors and for monitoring production, whereby a user can obtain real-time information of all machines located at different shop floors.

It is a further object of the present invention to provide a system and method for collecting production information from shop floors and for monitoring production, whereby a user can know in real time of any current abnormality in production, and can quickly respond to thereby maintain production.

It is a still further object of the present invention to provide a system and method for collecting production information and for monitoring production, wherein all production information including production abnormalities is stored in a database for future reference.

To achieve the above objects, the present invention provides a system and method for collecting production information from punch machines at shop floors and for monitoring production performed by the punch machines. The system comprises information collectors respectively connected to the punch machines, the information collectors obtaining machine-related real-time information and converting such information into computer-readable information; a monitoring computer located remotely from the shop floors and connected with the information collectors via a first communication link, the monitoring computer obtaining the computer-readable information from the information collectors according to pre-installed information obtaining instructions; and a database that stores information obtained by the monitoring computer and information set by users. Users can inquire of all information stored in the database at personal computers that are connected to the database via a second communication link. Each punch machine is assigned with a particular network ID representing its identification in the whole system. Therefore a user can readily identify information on a specific machine and control that machine's production.

BRIEF DESCRIPTION OF THE DRAWINGS

FIG. 4 illustrates details of four function modules visible in FIG. 3;

DETAILED DESCRIPTION OF THE INVENTION

Figure 1:
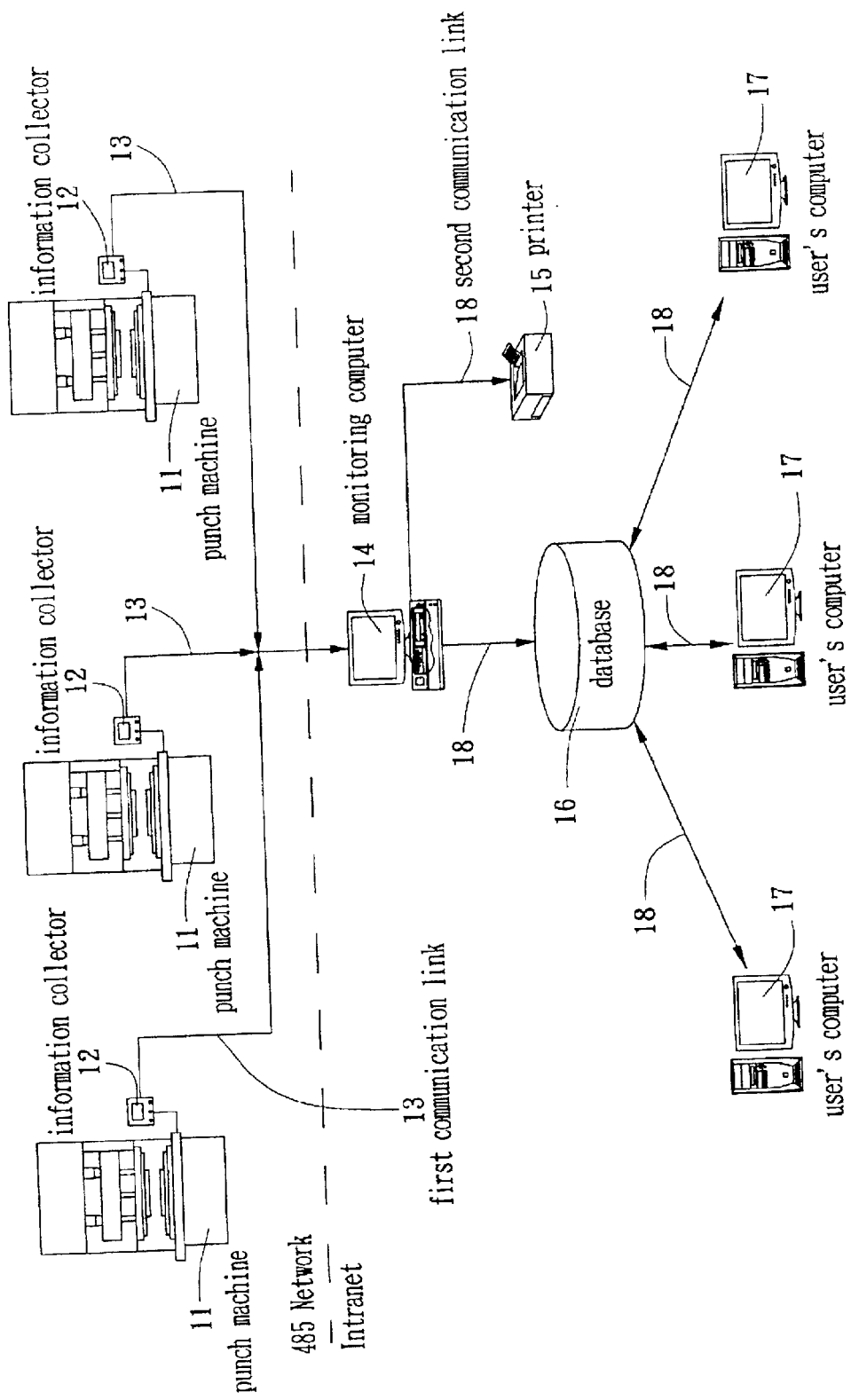
FIG. 1 schematically illustrates hardware of a system in accordance with a preferred embodiment of the present invention for collecting production information from punch machines on a factory shop floor and for monitoring production performed by the punch machines.

FIG. 1 schematically illustrates hardware of a system in accordance with a preferred embodiment of the present invention for collecting information from punch machines 11 on factory shop floors and for monitoring production performed by the punch machines 11. The punch machines 11 are located at different places on the shop floors. Each punch machine 11 has several sensors (not shown in FIG. 1) attached thereto, for sensing and generating real-time production information. For example, a safety-inspection sensor indicates real-time safety status of the punch machine 11. The status is either "normal" or "abnormal." Each punch machine 11 is equipped with an information collector 12. The information collector 12 is linked to the sensors, and converts the sensors' analog signals to digital signals that are computer-readable. A monitoring computer 14 is located remote from the shop floors, and is electrically connected to the information collectors 12 via a first communication link 13. The monitoring computer 14 is for obtaining production information concerning any shop floor, and storing the production information in a database 16. The database 16 is electrically connected to the monitoring computer 14 via a second communication link 18. The monitoring computer 14 has pre-installed programmable information obtaining instructions for obtaining production information from the information collectors 12. An output device 15 is electrically connected to the monitoring computer 14 via the second communication link 18. The output device 15 may be a printer or a display device for printing or displaying any information about production. All production and associated information is stored in the database 16, and can be accessed by users at personal computers 17 that are connected to the database 16 via the second communication link 18. In the preferred embodiment, the first communication link 13 is a local area network (LAN) suitable for a factory, such as a 485 network. The first communication link 13 is specially designed for a factory, and provides long-range transmission and resistance to disturbance. In the preferred embodiment, the second communication link 18 is an intranet.

Figure 2:
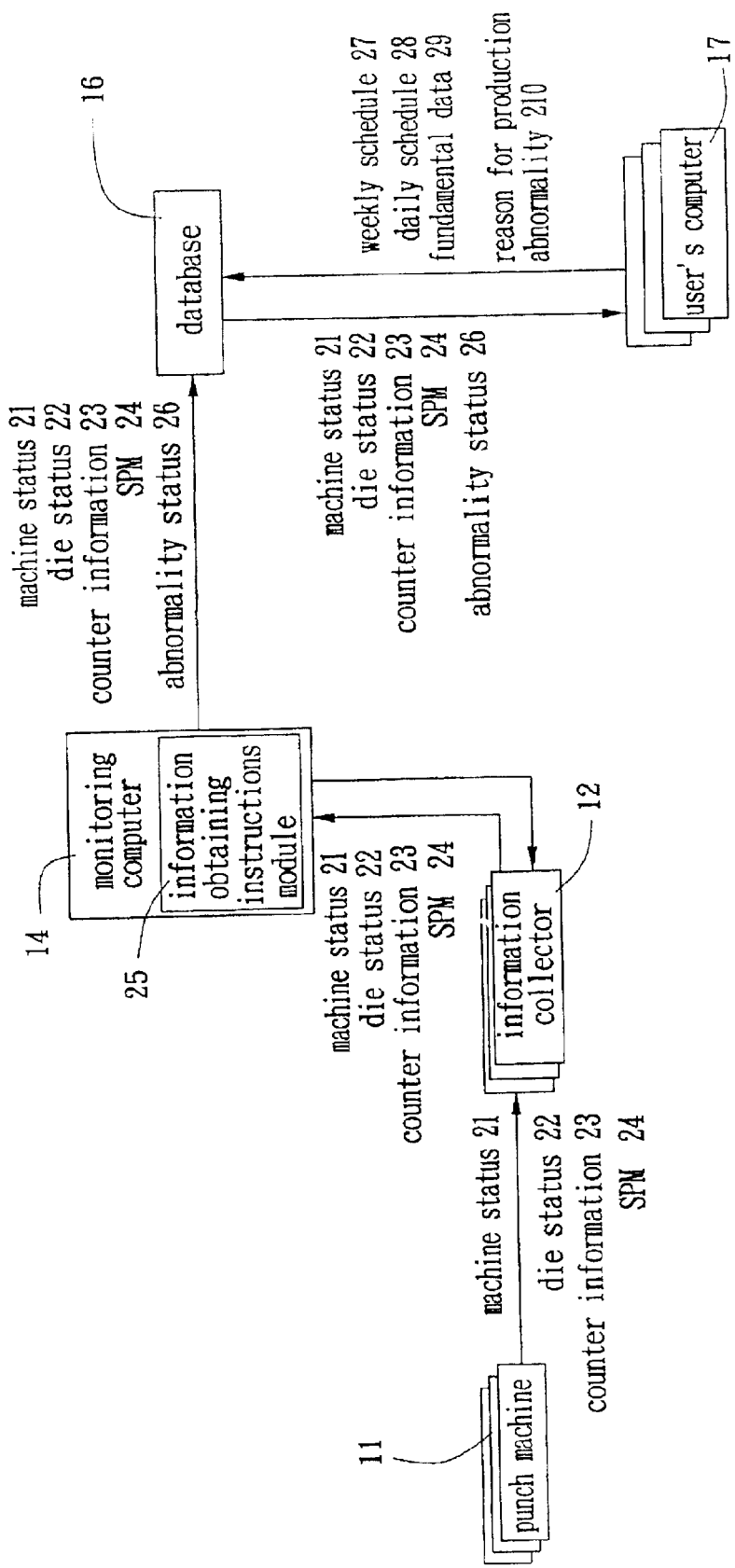
FIG. 2 shows data flow of the system of FIG. 1.

FIG. 2 shows data flow of the system of FIG. 1. The data flow comprises a first stream collected and stored by the system, and a second stream input by users.

As regards the first stream, information collected by each information collector 12 includes machine status 21, die status 22, counter information 23 and strokes per minute (SPM) 24. Machine status 21 is a current status of the punch machine 11, such as "unscheduled", "waiting", "producing", "testing die" and "repairing die". "Unscheduled" means the punch machine 11 stands idle; "waiting" means the punch machine 11 has been scheduled but has not yet started to run; "producing" means the punch machine 11 is running; "testing die" means the punch machine 11 is running only for the purpose of testing a die; "repairing die" means a die on the punch machine 11 is under repair and therefore the operator can change the die or wait until the repair is completed. Machine status 21 helps the operator to decide whether to change a current production schedule; and if so, how the schedule should be changed. Die status 22 comprises current punching times, accumulated punching times, and safety information. If the die is abnormal, the operator can check the safety information, immediately search for reasons for the abnormality, and resolve the problem to maintain production. Counter information 23 includes work hours, punching times, output amounts, and so on. SPM 24 is automatically calculated by current punching times and operating period, and changes according to changes in current punching times. The operator can forecast the die's remaining useful life by comparing its present SPM 24 with its standard SPM that is set in advance. Abnormality status 26 includes abnormality of a die and abnormality of a punch machine 11. Abnormality status 26 is generated in the monitoring computer 14 by comparing obtained information with pre-set standard criteria and thresholds. Any production abnormality is recorded and stored in the database 16. Similarly, other above-described information obtained by the monitoring computer 14 is also stored in the database 16.

As regards the second stream, an information obtaining instructions module 25 is stored in the monitoring computer 14. The information obtaining instructions module 25 can be designated by a user to obtain information on any punch machine 11. Data that is input by users includes users' responses to production abnormalities, fundamental data, and production schedules. As regards users' responses, a user can visit the database 16 to store and retrieve information via the user's personal computer 17 and the second communication link 18. The user can determine a reason for production abnormality 210 according to the abnormality status 26 and historical records of abnormalities stored in the database 16. The user can then store the determined reason for production abnormality 210 in the database 16 for future reference.

As regards fundamental data and production schedules, weekly schedule 27 indicates output for a week as scheduled by a production plan. In the preferred embodiment, the factory produces items according to an order made by a customer. When receiving an order, the factory schedules production according to the order. Weekly schedule 27 includes the scheduled year, the scheduled week, part number, item to be produced, order number, manufacture order's number, manufacture order's size, and so on. Daily schedule 28 indicates everyday output scheduled according to the weekly schedule, and contains scheduled date, scheduled start and end times, scheduled output, production line, part number, die number and so on. The operator can adjust daily schedule 28 according to actual production. Weekly schedule 27 and daily schedule 28 are input by hand or by selecting a predetermined standard schedule. Fundamental data 29 includes machine fundamental data, die fundamental data, and part numbers fundamental data. Machine fundamental data includes a production line that each punch machine 11 belongs to, a type of each punch machine 11, and an ID of each punch machine 11 in the 485 network. A production line has one or several punch machine(s) 11. The ID in the 485 network facilitates obtaining of information on a specific punch machine 11. Die fundamental data includes die standard status, and a range of settings that an operator can select to immediately adjust operation of a die. In the preferred embodiment, die fundamental data includes die number, a reference table of die-vs-part number, standard punching times, punching times alarm, standard SPM, and range of SPM. A die number may cross-reference with several part numbers, and a part number may cross-reference with several die numbers.

Figure 3:
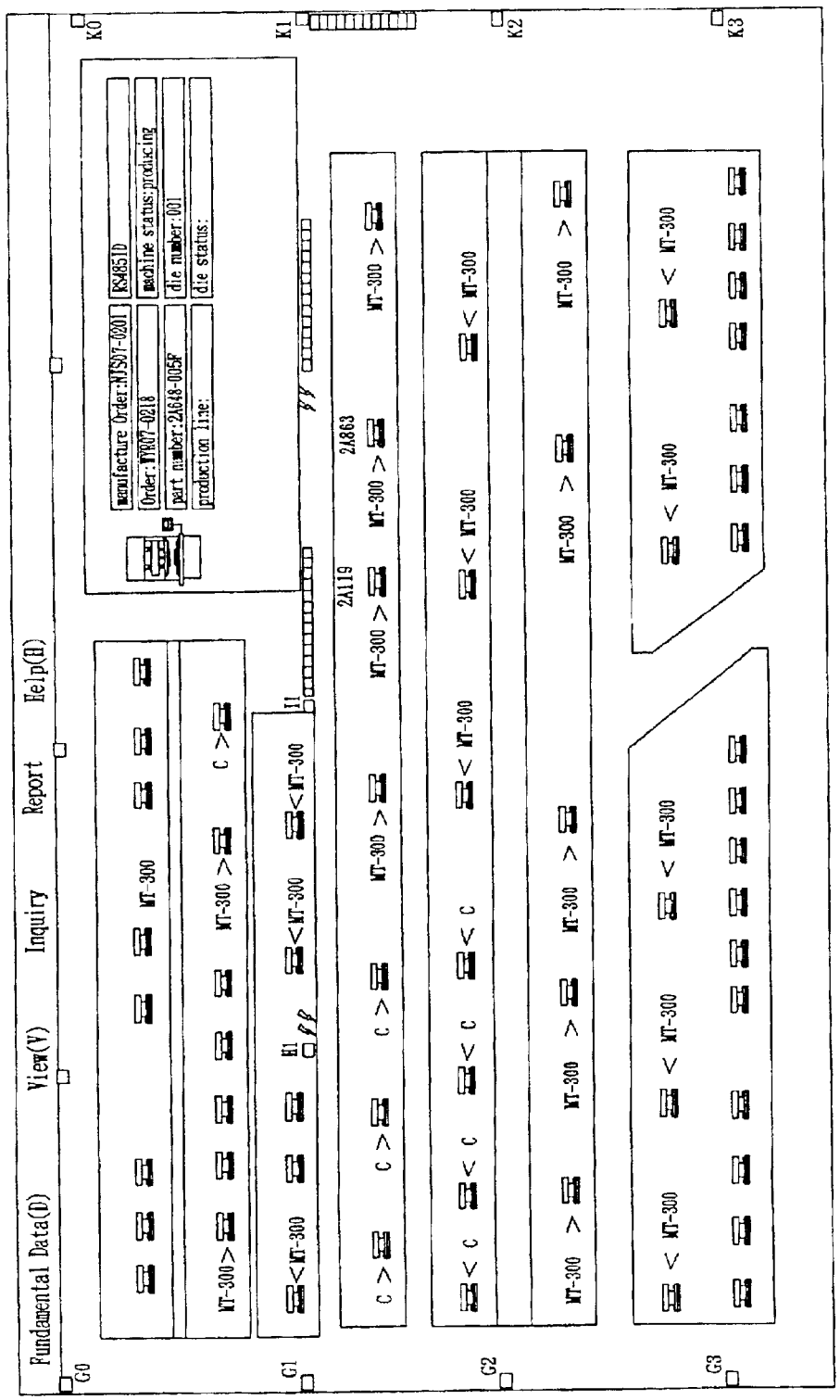
FIG. 3 is a graphical user interface displaying the system shown in FIG. 1.

FIG. 3 is a graphical user interface 30 displaying the system shown in FIG. 1. After logging into the system, the user sees a shop floor presentation of many icons. Each icon represents a punch machine 11, and the positions of the icons correspond to actual positions of the punch machines 11 on the shop floor. Therefore the user can readily find a desired machine. As soon as the user moves the mouse to an icon, relevant current information on the corresponding punch machine 11 is displayed in a blank area of the interface 30. In a function area at a top of FIG. 3, four function modules are visible: fundamental data module, view module, inquiry module and report module. These four function modules are illustrated in detail in FIG. 4.

FIG. 4 illustrates details of the four function modules visible in FIG. 3. Fundamental data module 41 is for setting and maintaining all kinds of fundamental data, and for managing users' access authorization. The fundamental data module 41 includes six sub-modules: "weekly schedule" 411, "daily schedule" 412, "die fundamental data" 413, "machine fundamental data" 414, "part number fundamental data" 415, and "authority management" 416. The "authority management" 416 sub-module is for setting and managing access authorization of groups of users and individual users. Operation of the "authority management" 416 sub-module is described in more detail below with reference to FIG. 6. View module 42 is for showing different kinds of information regarding a specific punch machine 11. View module 42 includes seven sub-modules: "order" 421, "manufacture order" 422, "part number" 423, "production line" 424, "machine status" 425, "die number" 426, and "counter information" 427. For example, if the user clicks on the "order" 421 sub-module, the user sees order information concerning a specific punch machine 11. If the user clicks on the "part number" 423 sub-module, the user sees part number information on a specific punch machine 11. Inquiry module 43 includes four sub-modules: "die status" 431, "machine status" 432, "whole status" 433, and "production information" 434. "Die status" 431 and "machine status" 432 display a historical record of a specific die or punch machine 11. "Whole status" 433 displays current information on all punch machines 11. "Production information" 434 displays current outputs of all punch machines 11. Report module 44 is for generating and outputting standard-form reports, and includes four sub-modules: "instant production report" 441, "die abnormality statistics" 442, "die accumulated punching times and abnormality statistics" 443, and "work hour statistics" 444.

Figure 5:
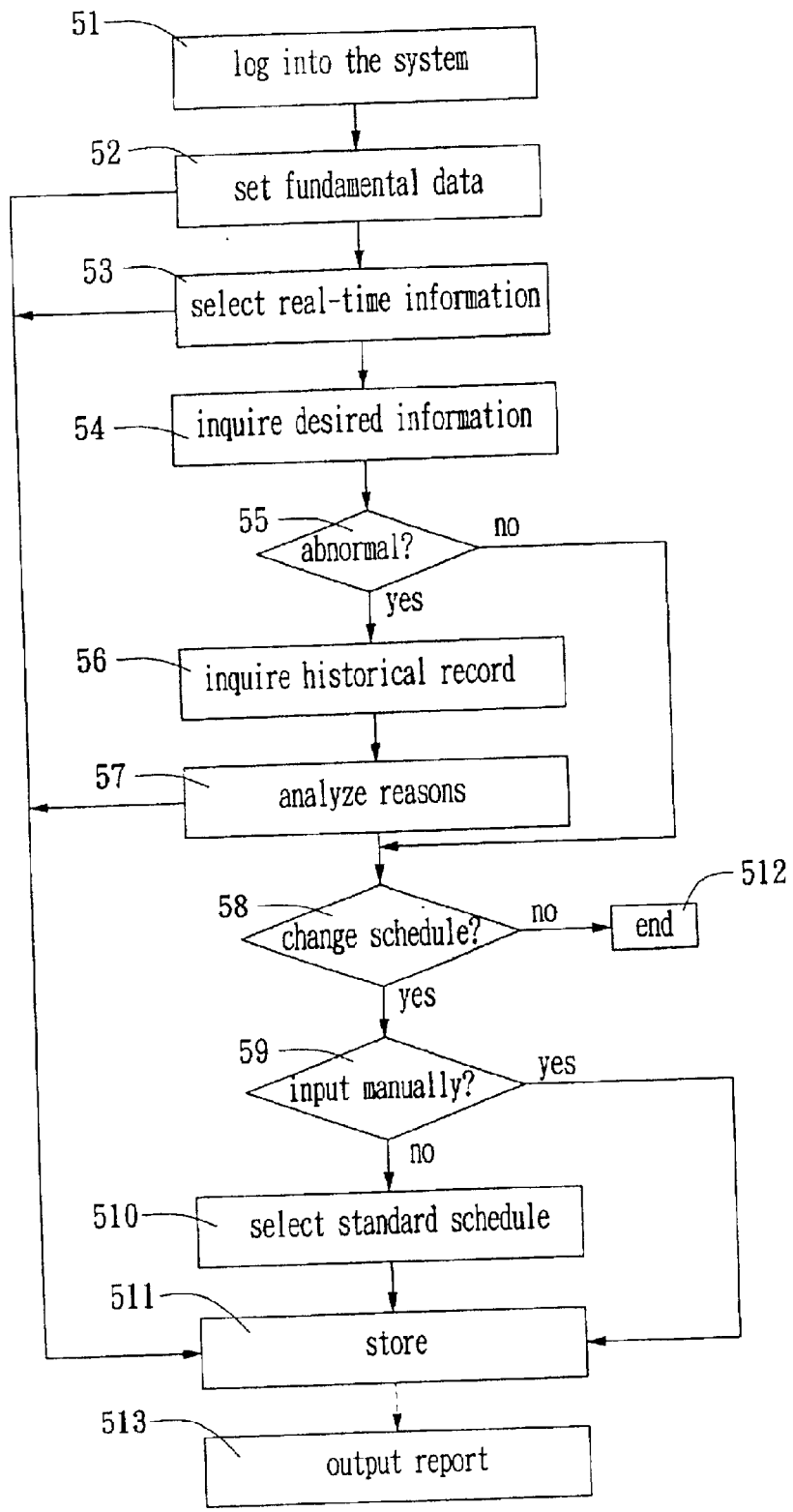
FIG. 5 is a flowchart of main operating procedures performed pursuant to the system of the present invention.

FIG. 5 is a flowchart of main operating procedures performed pursuant to the system of the present invention. In step 51, the user logs into the system by inputting his ID and password. In step 52, the user sets fundamental data 29 according to the user's authority, and the set fundamental data 29 is stored in the database 16. In step 53, the user selects real-time information on shop floors via the information obtaining instructions module 25. In step 511, the user stores the selected real-time information in the database 16. If necessary, in step 513, the user can output the information in a certain form. In step 54, the user inquires of desired information on shop floors according to need. In step 55, the user can ascertain whether the inquired information is abnormal. If the inquired information is abnormal, in step 56, the user further inquires of the historical record of reasons for abnormalities stored in the database 16. In step 57, the user promptly analyzes reasons for the current abnormality to resolve the matter quickly and maintain production. In step 511, reasons for the current abnormality are stored in the database 16 for future reference. If necessary, in step 513, the user can output the reasons for the current abnormality. After this, or if the inquired information is not abnormal, in step 58 the user decides whether to change a current production schedule or to reschedule production having regard to the real-time information obtained. If the user decides not to change or reschedule, then in step 512, the procedure is ended. If the user decides to change or reschedule, then in step 59, the user decides whether to manually input new scheduling instructions. If the user decides to manually input new scheduling instructions, then in step 511, the user stores the new scheduling instructions in the database 16. If necessary, in step 513, the user can output a report on the new scheduling instructions. If the user decides not to manually input new scheduling instructions, then in step 510, the user selects a standard schedule from a range of predetermined standard schedules. In step 511, the user stores the selected standard schedule in the database 16. If necessary, in step 513, the user can output a report on the new scheduling instructions or the new standard schedule, as the case may be.

Figure 6:
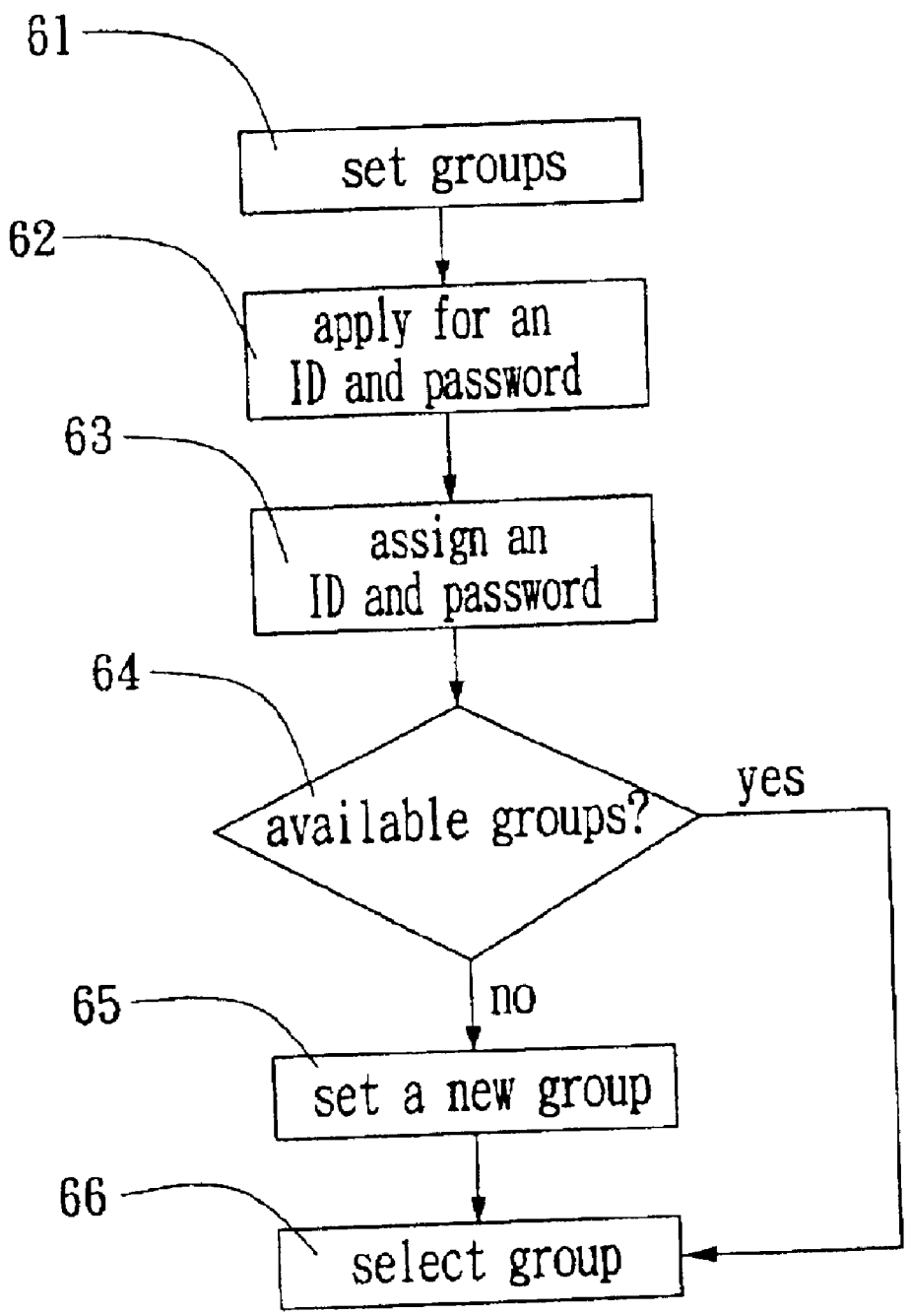
FIG. 6 is a flowchart of procedures for authorizing users to access the system of the present invention.

FIG. 6 is a flowchart of procedures for authorizing users to access the system of the present invention. In step 61, a system administrator sets different levels of access authorization for different groups of users, according to actual requirements of the factory. In step 62, an individual user applies for an ID and password. The individual user may be an operator, a foreman, or a supervisor. In step 63, the administrator assigns an ID and password to the individual user. The administrator then selects the groups that the ID is subordinate to according to the user's job position and needs. In step 64, the administrator decides whether there already are suitable groups available to meet the user's needs. If there are no or insufficient suitable groups available, then in step 65, the administrator sets a new group having a particular level of access authorization, and stores the new group in the database 16. After this, or if there already are suitable groups available, in step 66, the administrator selects the groups, in the user's ID. The user's ID may be subordinate to several groups, in which case the user's authority is the aggregate of the several groups' authorities.

The above-described preferred embodiment of the present invention is to be construed as being illustrative of the present invention and not restrictive. Modification of the preferred embodiment within the spirit of the invention will be apparent to those skilled in the art, and is included in the scope of the invention as defined by the following claims.

What is claimed is:

1. A system for monitoring machines operating at at least one shop floor, the system comprising:

a plurality of information collectors, each information collector linked to a corresponding for automatically obtaining specific machine-related signals and converting the specific machine-related signals into computer-readable information;

a monitoring computer pre-installed with programmable information obtaining instructions and electrically connected to the information collectors for obtaining the computer-readable information from the information collectors;

a database electrically connected to the monitoring computer for storing the computer-readable information collected by the monitoring computer and for storing fundamental data set by users; and a graphical user interface electrically connected to the database for users to monitor production information.

2. The system of claim 1, wherein the machine-related signals include machine status, die status and current production information.

3. The system of claim 1, wherein the fundamental data include machine fundamental data.

4. The system of claim 1, wherein the fundamental data include die fundamental data, and the die fundamental data include die standard status, and a range of settings that an operator can select to immediately adjust operation of a die.

5. The system of claim 4, wherein the die fundamental data include a reference table of die-vs-part number.

6. The system of claim 1, wherein the graphical user interface has icons for viewing the machines and viewing real-time information on the machines or on dies.

7. A method for monitoring machines operating at at least one shop floor, the method comprising the steps of:

providing information collectors for obtaining specific machine-related signals from the machines and changing the specific machine-related signals into computer-readable information;

providing a monitoring computer for obtaining the computer-readable information from the information collectors and storing the obtained information in a database; and providing a user interface for selectively illustrating a part of the information stored in the database.

8. The method of claim 7, further including the step of storing fundamental data in the database.

9. The method of claim 7, wherein the obtaining of the computer-readable information from the information collectors is performed by information-obtaining instructions that are stored in advance in the monitoring computer.

10. The method of claim 7, wherein the computer-readable information obtained by the monitoring computer includes machine status and die status.

11. The method of claim 10, further comprising the step of forecasting a lifetime of a die according to obtained die status information.

12. The method of claim 8, further comprising the step of generating information of abnormality status of any of the machines by comparing the obtained information with the fundamental data.

13. A procedure of operating a system for monitoring machines operating on at least one shop floor, comprising in sequence the steps of:

logging into the system;

setting fundamental data;

storing the data and outputting a corresponding report and ending this procedure, or further selecting real-time information;

storing the data and the information and outputting a corresponding report and ending this procedure, or further inquiring of desired information;

verifying normality of the information and the data by comparing the information with pre-set standard criteria and thresholds;

inquiring of historical records of reasons for abnormalities if abnormal, or directly checking whether a schedule change is desired if normal;

analyzing reasons according to the historical records of reasons for abnormalities if abnormal;

if abnormal, storing the information, the data and the reasons for future reference and outputting a corresponding report and ending the procedures or checking whether a schedule change is desired;

ending the procedure if no schedule change is desired;

determining whether to manually input information of a schedule change if desired;

manually inputting and storing the information of a schedule change and outputting a corresponding report and ending the procedure if manual input is desired, or selecting and storing a standard schedule if manual input is undesired; and outputting a report reflecting corresponding information and ending the procedure.

* * * * *